US008286208B2

(12) United States Patent
Pasko et al.

(10) Patent No.: US 8,286,208 B2
(45) Date of Patent: Oct. 9, 2012

(54) GRID RECORDING FOR VIDEO-ON-DEMAND

(75) Inventors: Douglas M. Pasko, Bridgewater, NJ (US); Carlos A. Cazanas, Bethlehem, PA (US); Brian Tims, Nazareth, PA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 519 days.

(21) Appl. No.: 12/512,308

(22) Filed: Jul. 30, 2009

(65) Prior Publication Data

US 2011/0030024 A1 Feb. 3, 2011

(51) Int. Cl.
*G06F 3/00* (2006.01)
*G06F 13/00* (2006.01)
*H04N 5/445* (2006.01)

(52) U.S. Cl. ............... 725/58; 725/88; 725/89; 725/90; 725/91; 725/92; 725/134; 725/142; 386/238; 386/292; 386/293; 386/294; 386/295; 386/296; 386/297; 386/298; 386/299

(58) Field of Classification Search ............... 725/58, 725/88–92, 134, 142; 386/238, 292–299
See application file for complete search history.

(56) References Cited

U.S. PATENT DOCUMENTS

| | | | | |
|---|---|---|---|---|
| 7,017,174 | B1* | 3/2006 | Sheedy | 725/87 |
| 7,546,283 | B2* | 6/2009 | Ota | 1/1 |
| 2007/0104456 | A1* | 5/2007 | Craner | 386/83 |
| 2008/0244660 | A1* | 10/2008 | Wodka et al. | 725/58 |
| 2008/0282312 | A1* | 11/2008 | Blinnikka | 725/153 |
| 2008/0285936 | A1* | 11/2008 | Yampanis et al. | 386/46 |
| 2009/0210533 | A1* | 8/2009 | Verhaegh et al. | 709/226 |
| 2009/0222875 | A1* | 9/2009 | Cheng et al. | 725/147 |
| 2009/0300673 | A1* | 12/2009 | Bachet et al. | 725/31 |

\* cited by examiner

*Primary Examiner* — Jason Salce

(57) ABSTRACT

A set top box determines DVR requests that the set top box is not able to record based on a number of scheduled DVR requests. The set top box provides the DVR request to a DVR management server. The DVR management server selects another set top box to record the television content associated with the DVR request based on a number DVR requests the other set top box is scheduled to record. The DVR management server issues a command to the other set top box to record the television content associated with the DVR request. The other set top box provides the recorded television content, associated with the DVR request, to the set top box.

19 Claims, 13 Drawing Sheets

GRID RECORDING FOR VIDEO-ON-DEMAND

BACKGROUND

In today's television content delivery systems, customers are provided an expansive array of television content, such as, television shows, movies, documentaries, sports, news, on-demand television, local programming, national programming, premium channels, and/or other types of television content (e.g., television guides, free programming, free events, games etc.). Given the expansive array of television content and the limited time customers may have to view such television content, service providers may offer their customers digital video recording (DVR) services. Typically, service providers may offer their customers a set top box that may include a DVR and storage (e.g., a hard drive) to record television content. However, DVR services may be limited to recording one or two television programs at once (i.e., airing at the same time). Thus, customers may not have the ability to record all of the television programming they may want to record.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

As will be described herein, a television content delivery system may coordinate customers' DVRs to record television content for other customers. In one implementation, the television content delivery system may include a network device that receives DVR requests from customers via their DVRs. The network device may distribute the load of recording television content based on activity (e.g., recording schedule) of DVRs associated with customers. Under this framework, a customer may have recorded, for example, three or more television programs, which may air at the same time. For example, a requesting customer may have two television programs recorded by his or her DVR and a third television program may be recorded by another customer's DVR. The DVR of the requesting customer may obtain the recording of the third television program from the other customer's DVR and the requesting customer may be able to watch the third television program.

Figure 1:
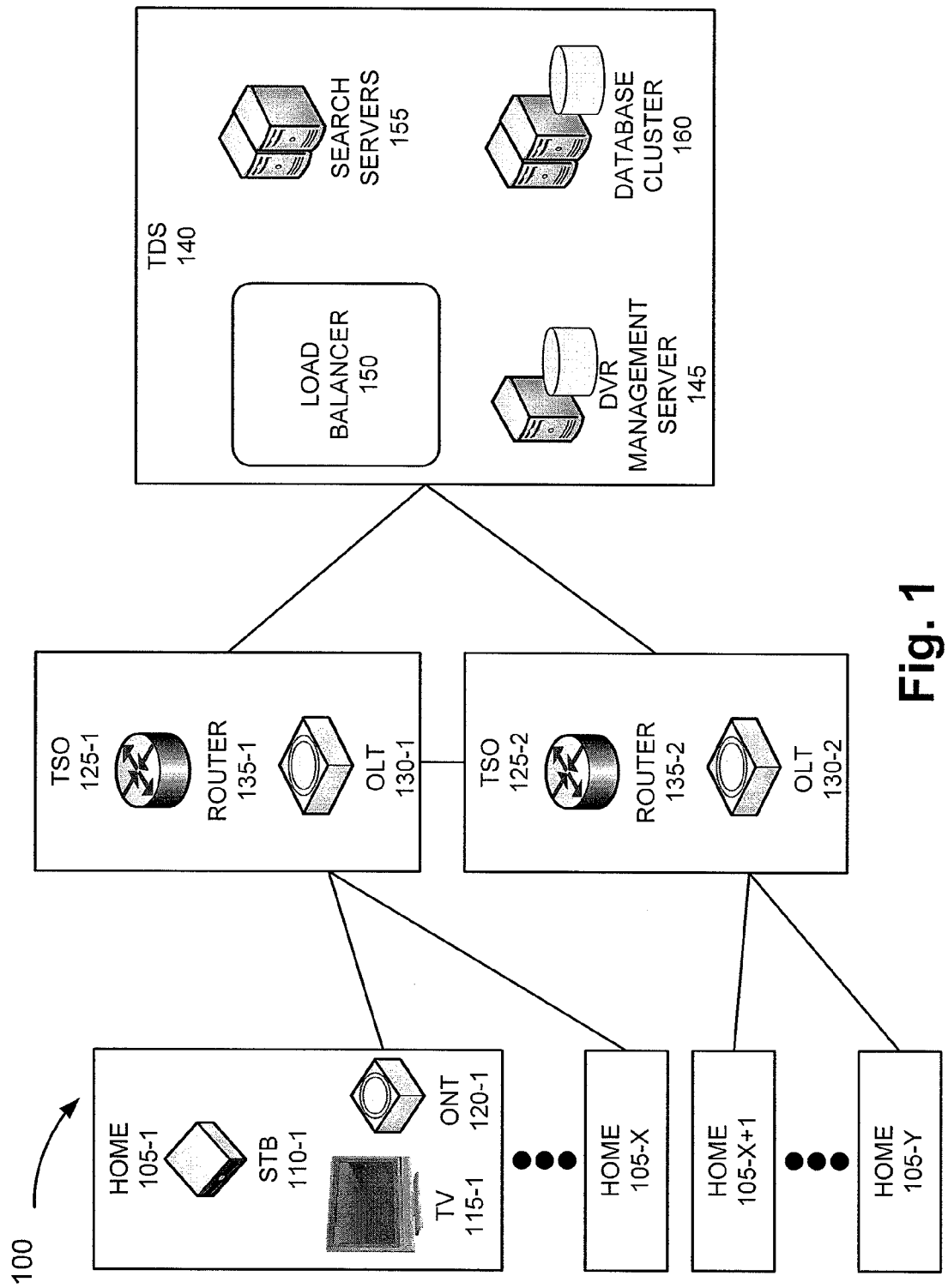
FIG. 1 is a diagram illustrating an exemplary environment of a television content delivery system that may coordinate customers' DVRs to record television content for other customers.

FIG. 1 is a diagram illustrating an environment 100 that may coordinate customers' DVRs to record television content for other customers. As illustrated in FIG. 1, exemplary environment 100 may include homes 105-1 through 105-Y (referred to generally as home 105). Home 105 may include a set top box 110, a television (TV) 115, and an optical network termination unit (ONT) 120. Environment 100 may include television serving offices (TSOs) 125-1 and 125-2 (referred to generally as TSO 125). TSO 125 may include an optical line termination unit (OLT) 130 and a router 135. Environment 100 may include a television distribution site (TDS) 140 that includes a DVR management server 145, a load balancer 150, search servers 155, and a database (DB) cluster 160.

Home 105 may correspond to a customer site. As illustrated, home 105 may include exemplary customer premise equipment, such as, for example, set top box 110, TV 115, and ONT 120. Set top box 110 may include a device to provide television content to TV 115. Set top box 110 may include a DVR and/or a DVR client. Set top box 110 will be described further below. TV 115 may include a device to display television content to a customer. ONT 120 may include a device that provides an interface between an optical distribution network and a customer site. For example, ONT 120 may provide an interface between home 105 and TSO 125.

TSO 125 may correspond to an intermediary television distribution site between home 105 and TDS 140. As illustrated, TSO 125 may include exemplary television distribution devices, such as, for example, OLT 130 and router 135. OLT 130 may include a device that serves as a point of origination for fiber-to-the-premises (FTTP) transmissions coming into and out of TDS 140. Router 135 may include a device that routes television content.

TDS 140 may correspond to a television distribution site. As illustrated, TDS 140 may include exemplary television distribution devices, such as, for example, a DVR management server 145, load balancer 150, search servers 155 and DB cluster 160. Television distribution device is intended to be broadly interpreted to include a device that, for example, facilitates the delivery of television content. DVR management server 145 may include a device that manages the recording of television content between customers' DVRs. For example, in one implementation, DVR management server 145 may correspond to a network computer that includes a DVR server. DVR management server 145 will be described further below. Load balancer 150 may include a device that manages the load (e.g., provisioning and delivery of television content to customers) among search servers 155. Load balancer 150 may distribute the load of delivering television content among search servers 155 in an equally distributed fashion. Search servers 155 may include devices that deliver television content to customers. DB cluster 160 may include a device that stores various types of data, such as, for example, an interactive programming guide (IPG), set top box configuration data, and/or customer profile data.

According to exemplary implementations, customers may issue DVR requests to their set top boxes 110 to record television content. The DVR clients of set top boxes 110 may receive a DVR request and may determine whether the DVR request is an excessive DVR request. In other words, the DVR client may determine whether the DVR request exceeds a number of DVR requests that set top box 110 can manage. For example, assume that set top box 110-1 may record no more than two television programs airing at the same time, and that the customer has issued three DVR requests to record three different television programs airing at the same time. In this case, the DVR client may upload the excessive DVR request (i.e., the third DVR request) to the DVR server of DVR management server 145.

The DVR server may receive the uploaded DVR request. In response, the DVR server may identify set top boxes 110 belonging to other customers which may fulfill the excessive DVR request. For example, the DVR server may determine whether any set top boxes 110 belonging to other customers are scheduled to record the third television program associated with the excessive DVR request. In the instance that a set top box 110 already has been selected to record the third television program (e.g., on behalf of yet another customer), the DVR server may, for example, issue a supplemental DVR command to record the third television program to the DVR client of set top box 110 that has already been selected to record the third television program. In this example, it may be assumed that no other set top boxes 110 have already been scheduled to record the third television program.

In the instance that the DVR server determines that there are no set top boxes 110 already scheduled to record the third television program, the DVR server may identify set top boxes 110 that may be in idle states (e.g., have no DVR requests to fulfill or only one television program to record) during a timeslot corresponding to the airing of the third television program. The DVR server may select one of set top boxes 110 to record the third television program on behalf of the customer originally making the DVR request. For example, assume that the DVR server selects set top box 110-X (not illustrated) belonging to home 105-X. The DVR server may, for example, issue a DVR record command to record the third television program to the DVR client of set top box 110-X. The DVR client of set top box 110-X may record the third television program in fulfillment of the received DVR record command.

In one implementation, upon completion of the recording of the third television program, set top box 110-X may automatically send the recording of the third television program to set top box 110-1. Set top box 110-1 may store the third television program. In another implementation, set top box 110-1 may receive the recording of the third television program when the customer (of home 105-1) issues a request to set top box 110-1 to play the third television program.

As a result of the foregoing, a television content delivery system may coordinate customers' DVRs to record television content for other customers. Customers may then not be limited to the number of television programs their DVRs may be capable of recording simultaneously. Since embodiments and implementations have been broadly described, variations to the above embodiments and implementations will be discussed further below.

It will be appreciated that the number of devices in and/or configuration of environment 100 is exemplary and provided for simplicity. In practice, environment 100 may include more, fewer, and/or different devices, and/or differently arranged devices than those illustrated in FIG. 1 and described herein. For example, set top box 110 and/or TV 115 may be implemented on a computer (e.g., a TV tuner card, a cable card, and/or a display), on a portable communication device, or on a stationary communication device (e.g., an Internet Protocol (IP) phone). Set top box 110 may be integrated into TV 115. In this regard, set top box 110 is to be broadly interpreted to include a device and/or a television client device that provides television content. Also, some functions described as being performed by a particular device may be performed by a different device, or some combination thereof, in other implementations.

Additionally, although environment 100 utilizes, for example, ONT 120 and OLT 130, in other implementations, connections other than optical connections may be utilized. For example, connections, such as cable, digital subscriber line (DSL), satellite may be utilized. In this regard, the embodiments described herein are not limited to any particular type of link, protocol, device, etc. Environment 100 may include wired and/or wireless connections. Further, it will be appreciated that the connections illustrated in FIG. 1 are exemplary and provided for simplicity.

Figure 2:
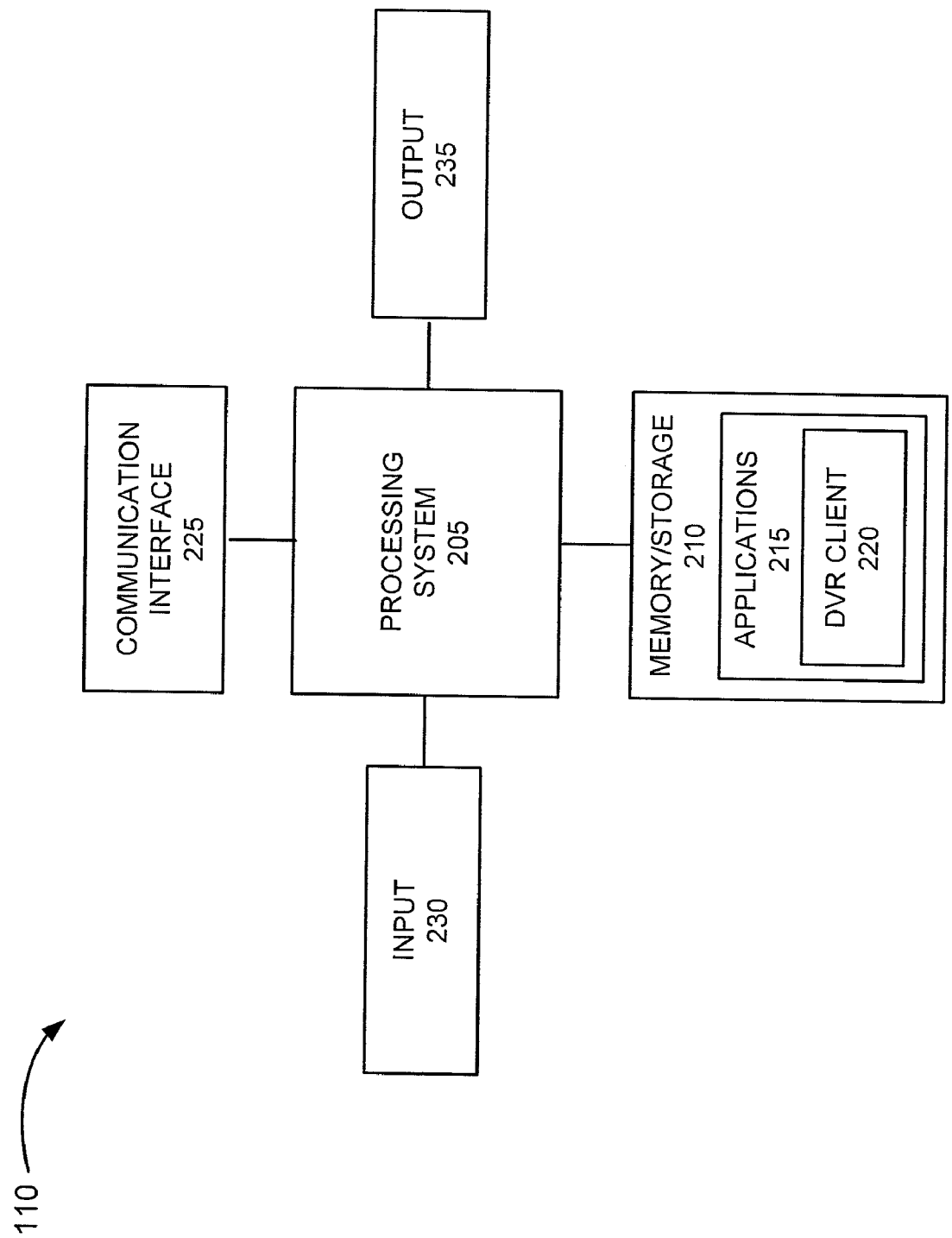
FIG. 2 is a diagram illustrating exemplary components of a set top box depicted in FIG. 1.

FIG. 2 is a diagram illustrating exemplary components of set top box 110. As illustrated, set top box 110 may include a processing system 205, memory/storage 210 including applications 215, a communication interface 225, an input 230, and an output 235. In other embodiments, set top box 110 may include fewer, additional, and/or different components, and/or a different arrangement of components than those illustrated in FIG. 2 and described herein. Additionally, other devices depicted in FIG. 1 may include one or more of the exemplary components described with respect to set top box 110.

Processing system 205 may include one or more processors, microprocessors, data processors, co-processors, network processors, application specific integrated circuits (ASICs), controllers, programmable logic devices, chipsets, field programmable gate arrays (FPGAs), and/or some other component that may interpret and/or execute instructions and/or data. Processing system 205 may control the overall operation, or a portion thereof, of set top box 110, based on, for example, an operating system and/or various applications (e.g., applications 215).

Memory/storage 210 may include memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. The computer-readable medium may be implemented in a single device, in multiple devices, in a centralized manner, or in a distributed manner. A computer-readable medium may correspond to, for example, a physical memory device or a logical memory device. A logical memory device may include memory space within a single physical memory device or spread across multiple physical memory devices.

Memory/storage 210 may store data, application(s), and/or instructions related to the operation of set top box 110. For example, memory/storage 210 may include applications 215 related to providing television services. For example, applications may include interactive television content (e.g., television guide, etc.) Applications 215 may include a DVR client 220. DVR client 220 will be described further below.

Communication interface 225 may permit set top box 110 to communicate with other devices, networks, and/or systems. For example, communication interface 225 may include a cable interface, a fiber optic interface, a radio interface, or some other type of wireless and/or wired interface.

Input 230 may permit a customer and/or another device to input information into set top box 110. For example, input 230 may include a button, an input port, a remote control sensor (e.g., an infrared sensor) and/or some other type of input component. Output 235 may permit set top box 110 to output information to a customer and/or another device. For example, output 235 may include a display, light emitting diodes (LEDs), an output port, and/or some type of output component.

As described herein, set top box 110 may perform certain operations in response to processing system 205 executing software instructions contained in a computer-readable medium, such as memory/storage 210. The software instructions may be read into memory/storage 210 from another computer-readable medium or from another device via communication interface 225. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

As previously described, DVR client 220 of set top box 110 may receive DRV requests from a customer and may upload the DVR requests to a DVR server of DVR management server 145. Depending on the number and times associated with the DVR requests, the DVR server may select another set top box 110 to satisfy one or more of the DVR requests. For example, the DVR server may issue a DVR record command to another DVR client 220 to record television content on behalf of DVR client 220. The other DVR client 220 may record the television content. The other DVR client 220 and DVR client 220 may coordinate with each other to transfer the recorded television content. Described below are the functional components that provide these processes and/or operations.

Figure 3:
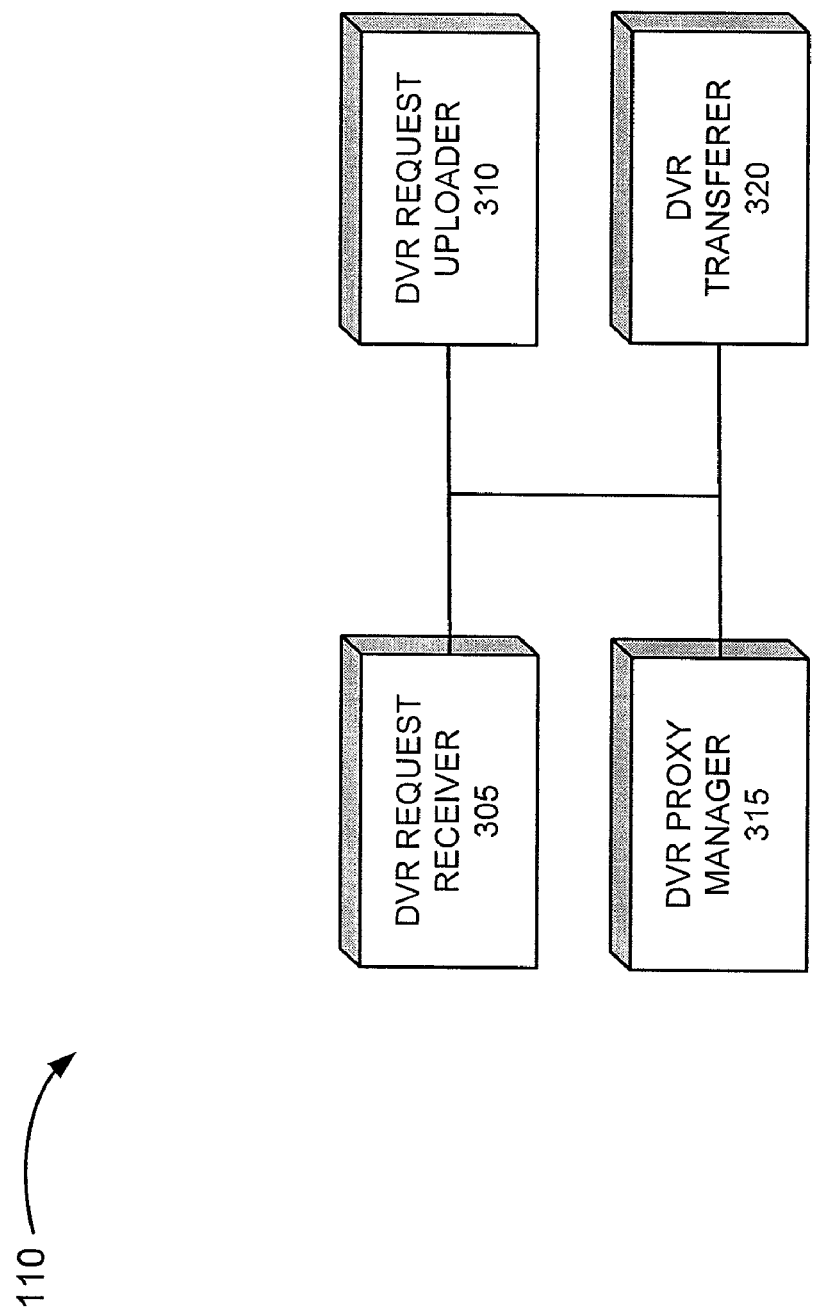
FIG. 3 is a diagram illustrating exemplary functional components of the set top box.

FIG. 3 is a diagram illustrating exemplary functional components of set top box 110. In other implementations, one or more of the functions associated with set top box 110 may be implemented wholly, or partially, in another device associated with, for example, TSO 125 and/or TDS 140. The functions described in connection with FIG. 3 may be performed by one or more components described above in connection with FIG. 2.

As illustrated in FIG. 3, set top box 110 may include a DVR request receiver 305, a DVR request uploader 310, a DVR proxy manager 315, and a DVR transferer 320. In one implementation, DVR request receiver 305, DVR request uploader 310, DVR proxy manager 315, and/or DVR transferer 320 may be implemented as a combination of hardware (e.g., processing system 205) and software (e.g., applications 215). In other implementations, DVR request receiver 305, DVR request uploader 310, DVR proxy manager 315, and/or DVR transferer 320 may be implemented in hardware.

DVR request receiver 305 may receive DVR requests. For example, a customer may issue a DVR request, which indicates that a particular television program be recorded, to set top box 110. The DVR request may include information, such as, for example, the name of the television program, the time the television program airs, and/or the channel on which the television program airs. DVR request receiver 305 may determine when a DVR request corresponds to an excessive DVR request. For example, as previously described, the excessive DVR request may correspond to a DVR request that exceeds the capabilities of set top box 110 (i.e., the number of television programs that set top box 110 is capable of recording simultaneously). DVR request receiver 305 may indicate if the DVR request has to be recorded by another set top box 110 (e.g., proxied). DVR request receiver 305 may also receive other types of DVR-based requests (e.g., a deletion of a DVR request to record).

DVR request uploader 310 may upload excessive DVR requests to another device. For example, DVR request uploader 310 may upload excessive DVR requests to DVR management server 145 (e.g., the DVR server). DVR request uploader 310 may upload excessive DVR requests, for example, periodically, based on a customer's input (e.g., a prompt to the customer to upload) and/or once the excessive DVR request is received by DVR request receiver 305.

DVR proxy manager 315 may manage excessive DVR requests originating from another set top box 110. For example, DVR proxy manager 315 may receive a DVR record command from the DVR server of DVR management server 145. DVR proxy manager 315 may interpret the DVR record command and manage the recording of television content based on the DVR record command.

DVR transferer 320 may communicate with another DVR transferer 320 to provide the recorded television content, associated with the DVR record command, to another set top box 110. In one implementation, upon completion of the recording of the television content, DVR transferer 320 may automatically send the recorded television content to the other set top box 110. In another implementation, DVR transferer 320 may send the recorded television content to the other set top box 110 when a customer, associated with the other set top box 110, issues a request to play the recorded television content.

Although FIG. 3 illustrates exemplary functional components of set top box 110, in other implementations, set top box 110 may include additional, fewer, different, and/or differently arranged functional components than those illustrated in FIG. 3 and described herein. Additionally, or alternatively, one or more operations described as being performed by a particular functional component may be performed by one or more other components, in addition to or instead of the particular functional component.

Figure 4:
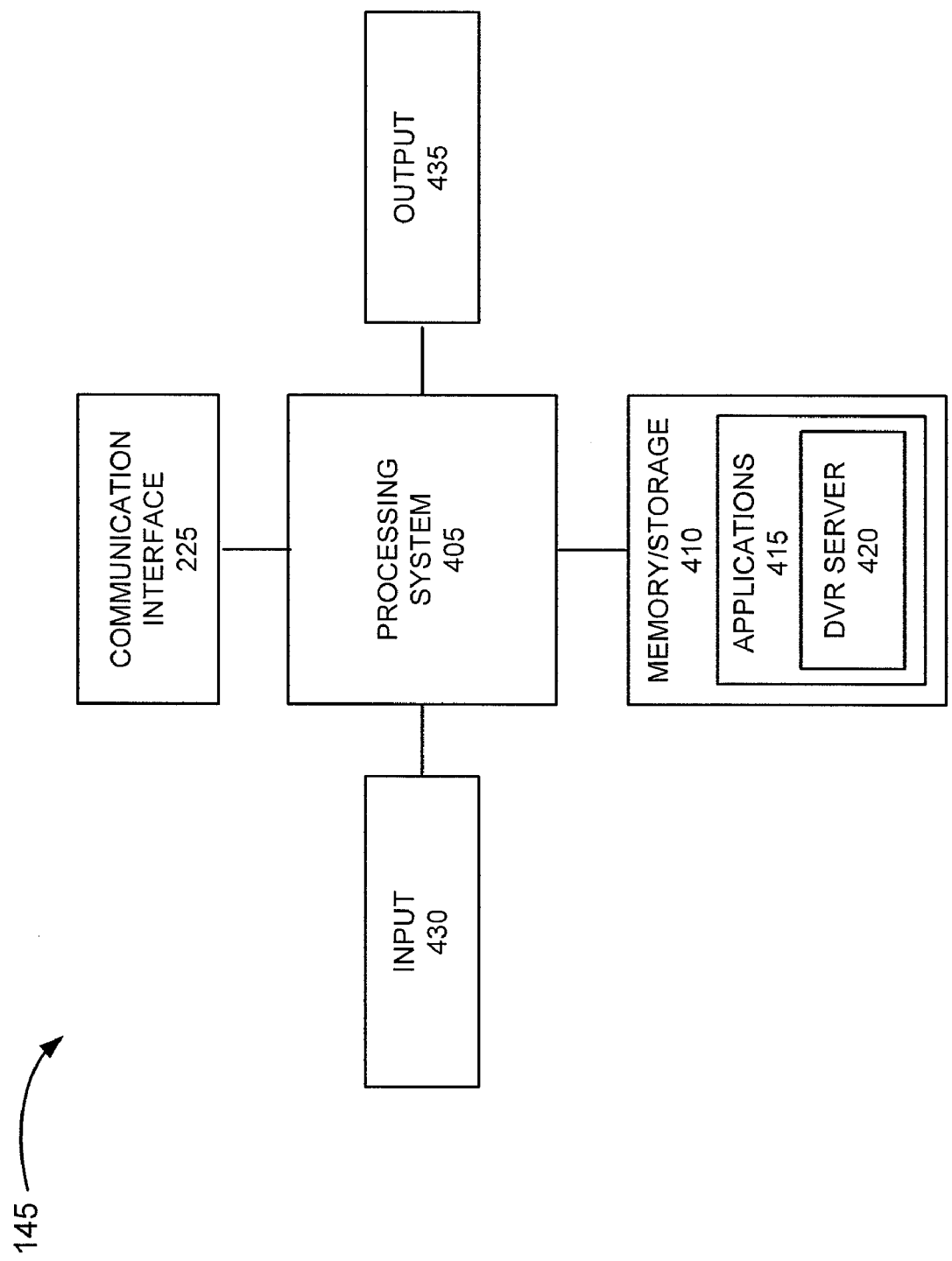
FIG. 4 is a diagram illustrating exemplary components of a DVR management server depicted in FIG. 1.

FIG. 4 is a diagram illustrating exemplary components of DVR management server 145. As illustrated, DVR management server 145 may include a processing system 405, memory/storage 410 including applications 415, a communication interface 425, an input 430, and an output 435. In other embodiments, DVR management server 145 may include fewer, additional, and/or different components and/or a different arrangement of components than those illustrated in FIG. 4 and described herein.

Processing system 405 may include one or more processors, microprocessors, data processors, co-processors, network processors, ASICs, controllers, programmable logic devices, chipsets, FPGAs, and/or some other component that may interpret and/or execute instructions and/or data. Processing system 405 may control the overall operation, or a portion thereof, of DVR management server 145, based on, for example, an operating system and/or various applications (e.g., applications 415).

Memory/storage 410 may include memory and/or secondary storage. For example, memory/storage 210 may include RAM, DRAM, ROM, PROM, a flash memory, and/or some other type of memory. Memory/storage 410 may include a hard disk (e.g., a magnetic disk, an optical disk, a magneto-optic disk, a solid state disk, etc.) or some other type of computer-readable medium, along with a corresponding drive.

Memory/storage 410 may store data, application(s), and/or instructions related to the operation of DVR management server 145. For example, memory/storage 410 may include applications 415 that coordinate customers' DVRs to record television content for other customers. Applications 415 may include a DVR server 420. DVR server 420 will be described further below.

Communication interface 425 may permit DVR management server 145 to communicate with other devices, networks, and/or systems. For example, communication interface 425 may include a T-3 interface, a fiber optic interface, a radio interface, or some other type of wireless and/or wired interface.

Input 430 may permit a user and/or another device to input information in DVR management server 145. For example, input 430 may include a keyboard, a keypad, a display, a touchpad, a mouse, a button, a microphone, an input port, a drive, voice recognition logic, and/or some other type of input component. Output 435 may permit DVR management server 145 to output information to a user and/or another device. For example, output 435 may include a display, a speaker, light emitting diodes (LEDs), an output port, and/or some type of output component.

As described herein, DVR management server 145 may perform certain operations in response to processing system 405 executing software instructions contained in a computer-readable medium, such as memory/storage 410. The software instructions may be read into memory/storage 410 from another computer-readable medium or from another device via communication interface 425. The software instructions contained in memory/storage 410 may cause processing system 405 to perform processes described herein. Alternatively, hardwired circuitry may be used in place of or in combination with software instructions to implement processes described herein. Thus, implementations described herein are not limited to any specific combination of hardware circuitry and software.

As previously described, DVR server 420 of DVR management server 145 may receive excessive DVR requests from DVR clients 220 of set top boxes 110. DVR server 420 may recognize that a customer has issued more DVR requests than his or her set top box 110 can handle. DVR server 420 may identify a set top box 110, belonging to another customer, to fulfill the excessive DVR request. Described below are the functional components that provide these processes and/or operations.

Figure 5:
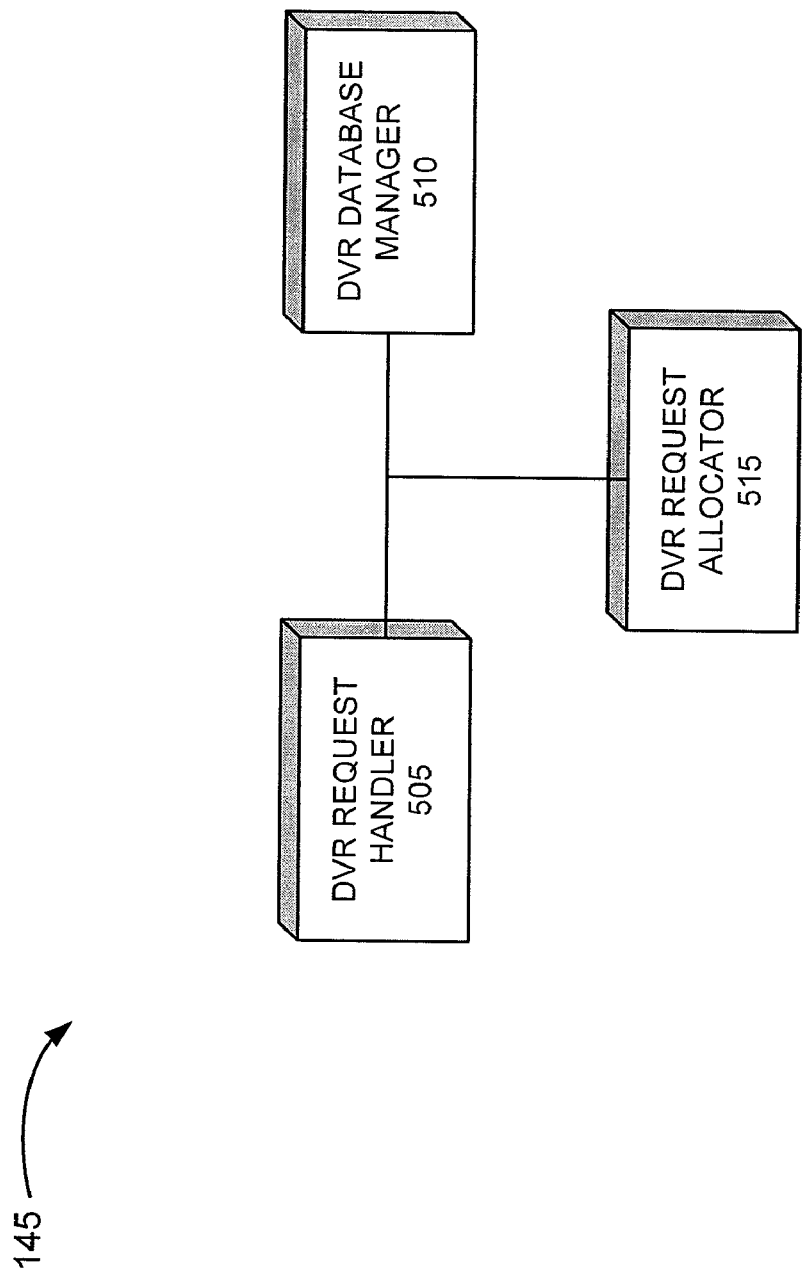
FIG. 5 is a diagram illustrating exemplary functional components of the DVR management server.

FIG. 5 is a diagram illustrating exemplary functional components of DVR management server 145. In other implementations, one or more of the functions associated with DVR management server 145 may be implemented wholly, or partially, in another device associated with, for example, TSO 125 and/or TDS 140. For example, one or more functions associated with DVR management server 145 may be implemented wholly, or partially, in search servers 155. The functions described in connection with FIG. 5 may be performed by one or more components described above in connection with FIG. 4.

As illustrated in FIG. 5, DVR management server 145 may include a DVR request handler 505, a DVR database manager 510, and a DVR allocator 515. In one implementation, DVR request handler 505, DVR request database manager 510, and/or DVR request allocator 515 may be implemented as a combination of hardware (e.g., processing system 405) and software (e.g., applications 415). In other implementations, DVR request handler 505, DVR request database manager 510, and/or DVR request allocator 515 may be implemented in hardware.

DVR request handler 505 may receive excessive DVR requests uploaded by DVR request uploader 310 of set top box 110. DVR request handler 505 may also receive other types of DVR-based messages (e.g., a deletion of a DVR request to record).

DVR database manager 510 may store the received excessive DVR requests in a database. DVR database manager 510 may manage the database.

DVR request allocator 515 may identify a set top box 110 (e.g., a proxy set top box 110) to record television content on behalf of another set top box 110. For example, DVR request allocator 515 may select a set top box 110 that is already scheduled to record a television program associated with the received excessive DVR request. In the event that there is a set top box 110 already scheduled to record the television program associated with the received DVR request (e.g., based on an excessive DVR request received from another customer), DVR request allocator 515 may issue a supplemental DVR record command to the identified set top box 110. In one implementation, the DVR record command may include the excessive DVR request. The DVR record command may include an address (e.g., a network address) associated with the other set top box 110. In this way, after the television content is recorded, set top box 110 may provide the recorded television content to the other set top box 110. Additionally, the supplemental DVR record command may be issued, despite the fact that a previous DVR record command was issued, so that the identified set top box 110 will fulfill the excessive DVR request, even if the original or first DVR record command is retracted (e.g., if one of the two customers changes his or her mind and cancels the excessive DVR request).

In the event that there is no set top box 110 already scheduled to record the television program associated with the received excessive DVR request, DVR request allocator 515 may select a set top box that is in idle state (e.g., has no DVR requests to fulfill or the number of DVR requests are fewer than a number of DVR requests that set top box 110 is capable of recording at one time). DVR request allocator 515 may issue a DVR record command to the identified set top box 110. In one implementation, the DVR record command may include the excessive DVR request. The DVR record command may include an address (e.g., a network address) associated with the other set top box 110. In this way, after the television content is recorded, set top box 110 may provide the recorded television content to the other set top box 110.

Although FIG. 5 illustrates exemplary functional components of DVR management server 145, in other implementations, DVR management server 145 may include additional, fewer, different, and/or differently arranged functional components than those illustrated in FIG. 5 and described herein. Additionally, or alternatively, one or more operations described as being performed by a particular functional component may be performed by one or more other functional components, in addition to or instead of the particular functional component.

FIGS. 6A-6E are diagrams illustrating exemplary operations performed by set top box 110 and DVR management server 145 for coordinating customers' DVRs to record television content for other customers. In one implementation, the exemplary operations may be performed by DVR client 220 of set top box 110 and DVR server 420 of DVR management server 145.

Figure 6A:
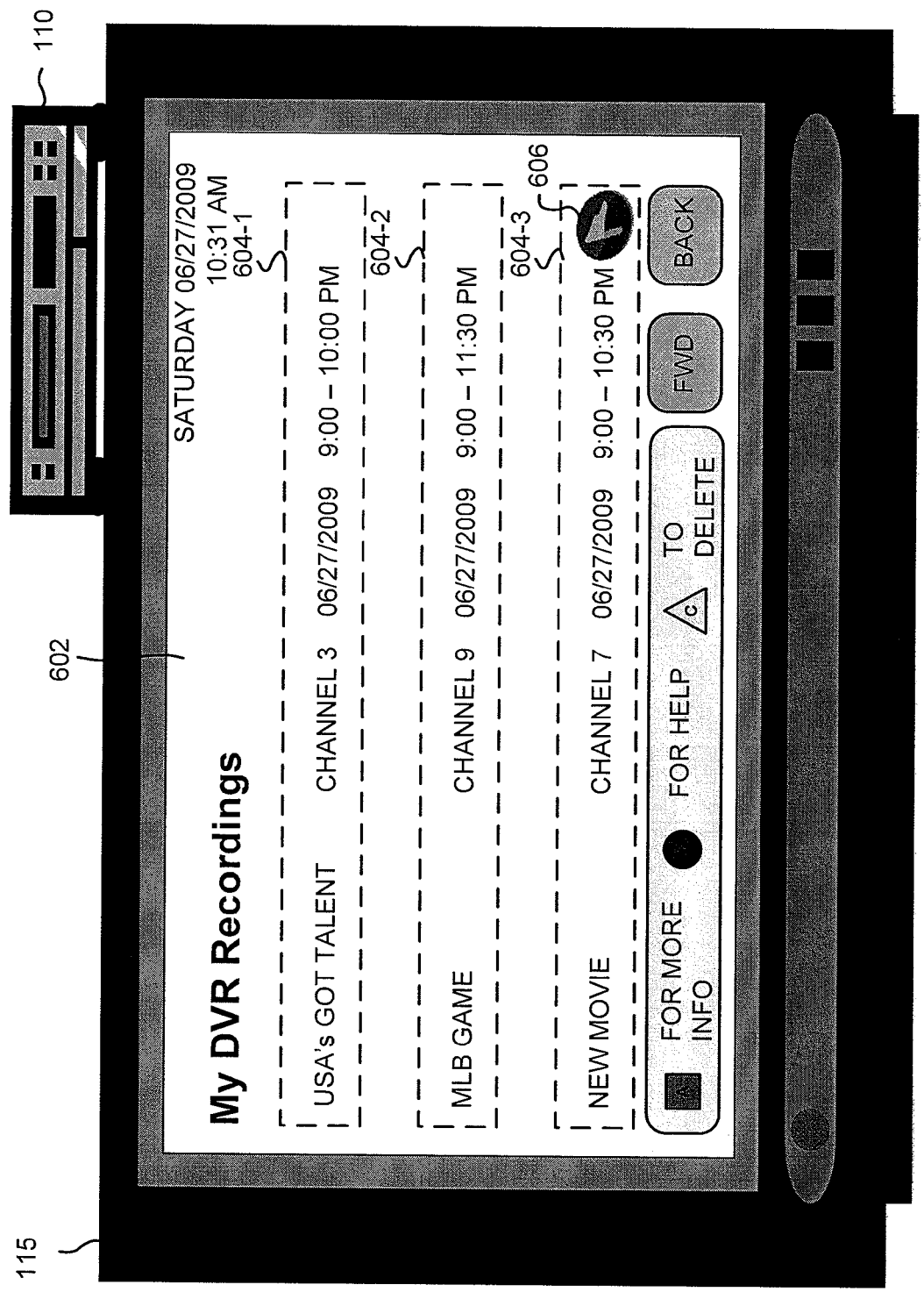
FIGS. 6A-6E are diagrams illustrating exemplary operations performed by the set top box and/or the DVR management server to coordinate customers' DVRs to record television content for other customers.

Referring to FIG. 6A, a customer may access an exemplary graphical user interface (GUI) 602 on TV 115 via set top box 110. GUI 602 may correspond to an interactive application 215, associated with DVR client 220 (e.g., DVR request receiver 305), that permits the customer to select television content that the customer wishes to be recorded. GUI 602 may indicate DVR requests made by the customer. For example, GUI 602 may provide a list of scheduled recordings 604-1, 604-2 and 604-3 (referred to generally as scheduled recording 604). Scheduled recording 604 may indicate, for example, a name of a television program to be recorded, a channel on which the television program airs, as well as a day, and a time the television program is scheduled to air.

Additionally, as illustrated, GUI 602 may indicate when a scheduled recording 604 requires a proxy to record the television program. For example, assume that set top box 110 may record only two television programs airing at the same time. DVR request receiver 305 may recognize that scheduled recording 604-3 exceeds the number of DVR requests that may be recorded. In one implementation, DVR request receiver 305 may assign a proxy flag 606 to scheduled recording 604-3 to indicate that scheduled recording 604-3 may be recorded by another set top box 110. In one implementation, the assignment of proxy flag 606 to a particular scheduled recording 604 may be based on a time order the DVR requests are received by set top box 110.

Figure 6B:
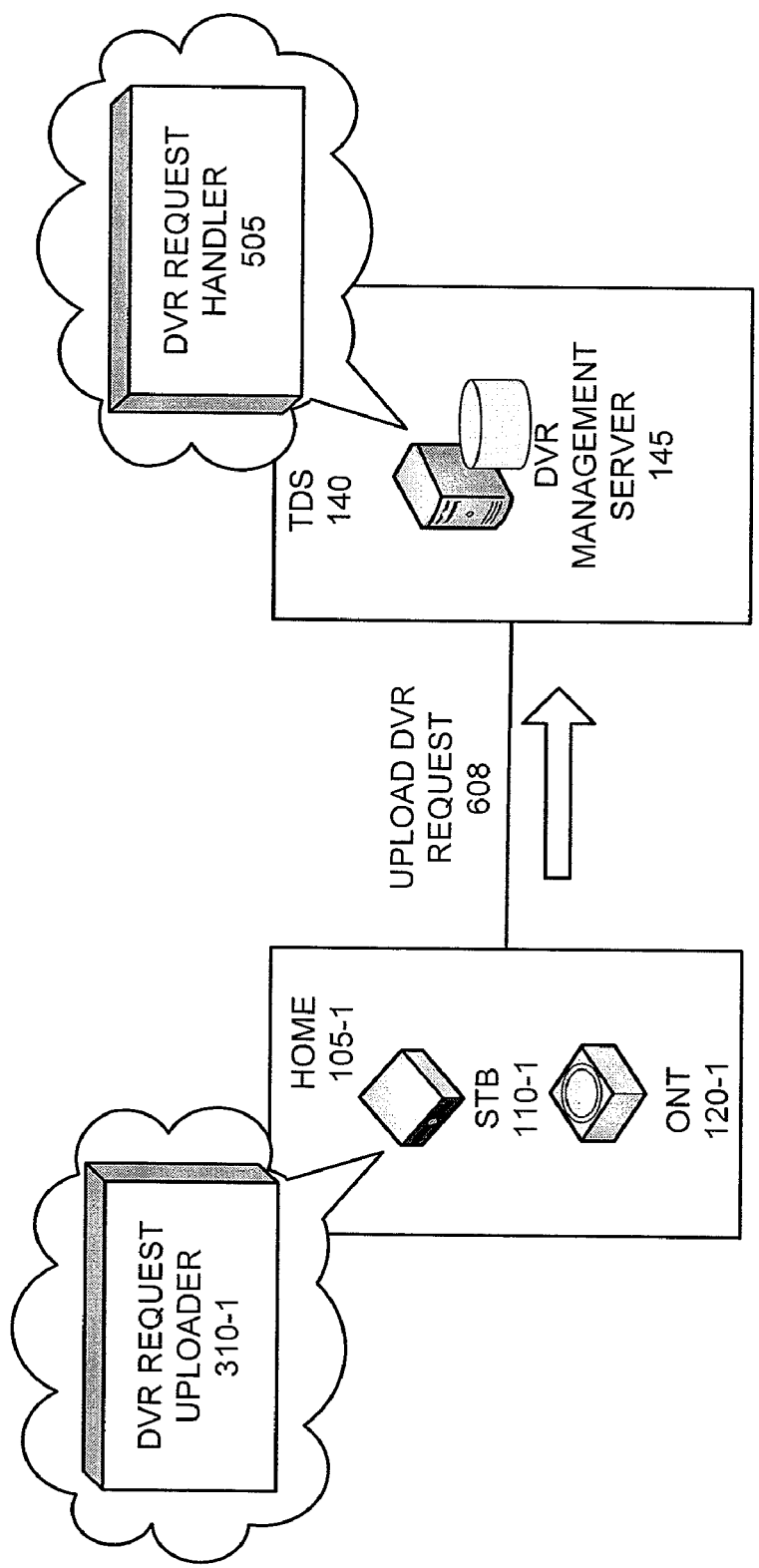

Referring to FIG. 6B, as previously described, set top box 110 may upload DVR requests to DVR management server 145. For example, as illustrated, DVR request uploader 310-1 may upload a DVR request 608 (e.g., scheduled recording 604-3 (an excessive DVR request)) to DVR request handler 505 of DVR management server 145. In one implementation, DVR request uploader 310-1 may upload DVR request 608 based on the customer's input (e.g., the customer may initiate an upload in response to a prompt provided by GUI 602). In another implementation, DVR request uploader 310-1 may upload DVR request 608 based on a periodic uploading scheme. In yet another implementation, DVR request uploader 310-1 may upload DVR request 608 once DVR request 608 is received by DVR request receiver 305-1. In circumstances when, for example, DVR request 608 (i.e., scheduled recording 604-3) is deleted (e.g., on set top box 110-1 by the customer), DVR request uploader 310-1 may upload other types of messages (e.g., a DVR request deletion message). The DVR request deletion message may be uploaded in a manner similar to DVR request 608 (e.g., based on customer input, etc.). In this way, DVR management server 145 may not unnecessarily have another set top box 110 record the television content.

As previously described, DVR database manager 510 may store the uploaded DVR request 608 in a database. DVR database manager 510 may also manage (e.g., update, etc.) the data associated with the database.

Figure 6C:
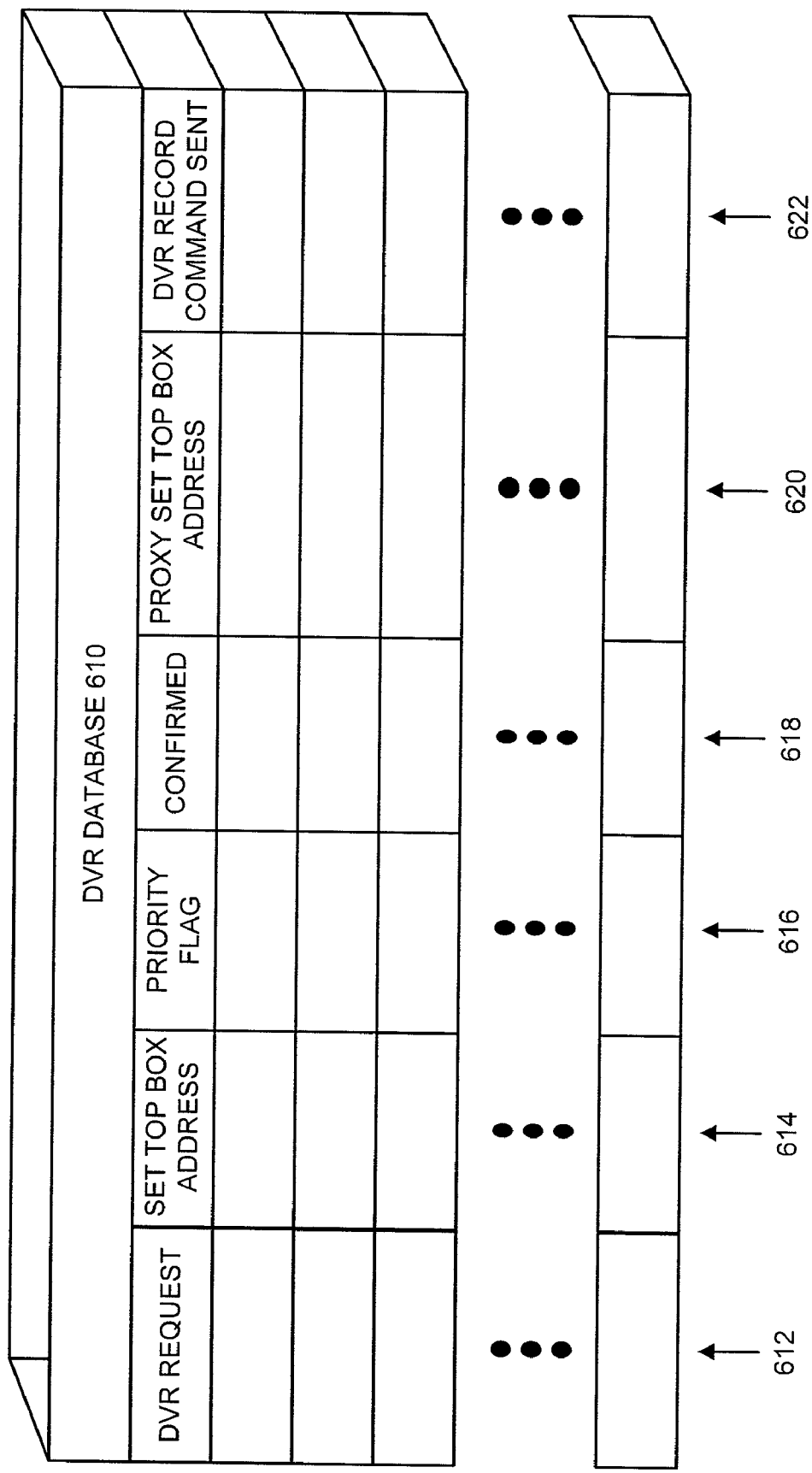

FIG. 6C is a diagram illustrating a portion of an exemplary DVR database 610 that may store excessive DVR requests and other DVR-related information. As illustrated, DVR database 610 may include a DVR request field 612, a set top box address field 614, a priority flag field 616, a confirmed field 618, a proxy set top box address field 620, and a DVR record command sent field 622. In other implementations, DVR database 610 may include additional, fewer, and/or different information fields than those illustrated in FIG. 6C and described herein.

DVR request field 612 may include information corresponding to an excessive DVR request. For example, DVR request field 612 may indicate a name of a television program to be recorded, a channel on which the television program airs, as well as a day, and a time the television program is scheduled to air.

Set top box address field 614 may include information corresponding to an address (e.g., a network address, such as, an IP address) associated with set top box 110 from which the excessive DVR request originated. Set top box address field 614 may include other types of set top box 110 information (e.g., model, set top box identifier (ID), etc.).

Priority flag field 616 may include information indicating that the DVR request needs to be proxied. For example, as previously described, scheduled recording 604 may indicate priority flag 606. Priority flag field 616 may indicate this information.

Confirmed field 618 may include information corresponding to a confirmation flag indicating that the excessive DVR request will be recorded. For example, DVR server 420 and DVR client 220, associated with proxy set top box 110, may exchange a message (e.g., a handshaking message) some period of time before the scheduling of the recording to indicate that proxy set top box 110 is up and running and/or that proxy set top box 110 will be proceeding with the recording.

Proxy set top box address field 620 may include information corresponding to an address (e.g., a network address, such as, an IP address) associated with a proxy set top box 110 that will fulfill the excessive DVR request. Proxy set top box address field 620 may include other types of set top box 110 information (e.g., model, set top box identifier (ID), etc.).

DVR record command sent field 625 may include information corresponding to a flag indicating that a DVR record command has been sent to the proxy set top box 110. For example, as previously described, in one implementation, DVR request allocator 515 may send a DVR record command to proxy set top box 110 so that the excessive DVR request may be fulfilled.

Although not illustrated, in one implementation, DVR management server 145 may maintain a customer database that includes customer information. The customer information may indicate customers that subscribe to the DVR service described herein. The database may include set top box information that indicates set top box(es) 110 associated with each customer and a level of television service. In this way, DVR request allocator 515 may recognize available resources (e.g., set top boxes 110, television content that set top box 110 is authorized to receive) and may distribute or apportion the excessive DVR requests to set top boxes 110 that may be in an idle state. In another implementation, DVR database 610 may store the information described as being stored in the customer database.

Figure 6D:
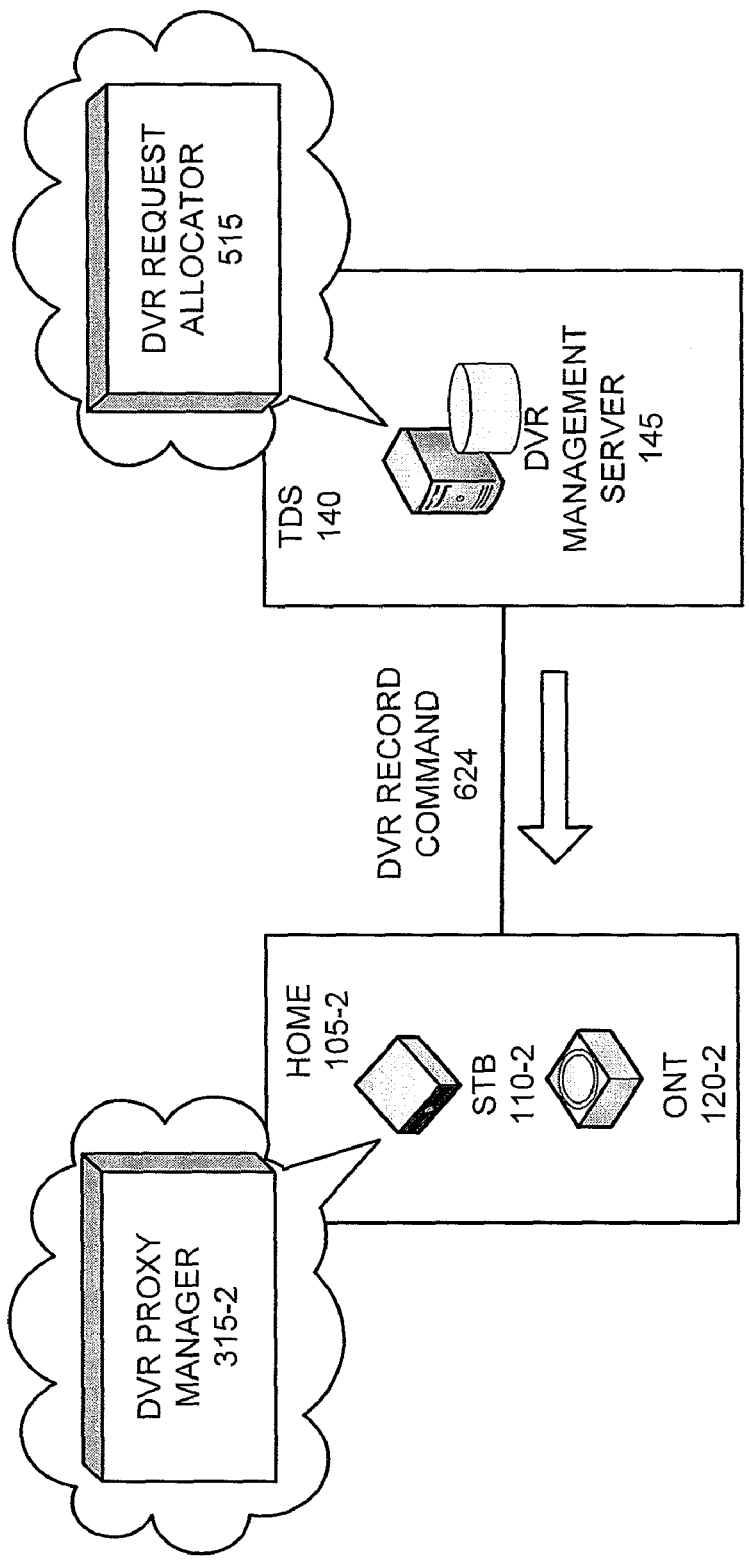

Referring to FIG. 6D, as previously described, DVR request allocator 515 may identify a set top box 110 (e.g., a proxy set top box 110) to record television content on behalf of another set top box 110. In one implementation, DVR request allocator 515 may consult DVR database 610 to identify excessive DVR requests. For example, DVR request allocator 515 may identify an excessive DVR request based on priority flag field 616 of DVR database 610. DVR request allocator 515 may consult DVR database 610 and/or customer database to allocate the excessive DVR requests to other set top boxes 110 (e.g., proxy set top boxes 110). DVR request allocator 515 may identify set top boxes 110 that may already be scheduled to record the television program associated with the DVR request and/or set top boxes 110 may be in an idle state based on the number of DVR requests associated with each set top box 110. DVR request allocator 515 may also determine whether a set top box 110, which may be in an idle state, is authorized to receive the television content corresponding to the DVR request. For example, in some instances, there may be a set top box 110 in an idle state. However, the DVR request may be a request to record television content, in which set top box 110 may not be eligible to receive due to a level of television service associated with set top box 110. Thus, DVR request allocator 515 may ensure that set top box 110, which is selected to be a proxy set top box 110, is eligible to receive the television content associated with the DVR request.

Referring back to FIG. 6B, DVR request 608 may be sent from set top box 110-1, of home 105-1, and referring to FIG. 6D, it may be assumed that DVR request allocator 515 selects set top box 110-2, of home 105-2, as proxy set top box 110-2, to fulfill the excessive DVR request (e.g., scheduled recording 604-3, as illustrated in FIG. 6A).

Once DVR request allocator 515 determines proxy set top box 110-2 to fulfill the excessive DVR request, DVR request allocator 515 may send a DVR record command 624 to proxy set top box 110-2. It will be appreciated, depending on the circumstances, DVR record command 624 may correspond to a supplemental DVR record command 624. DVR request allocator 515 may update proxy set top box address field 620 and DVR record command sent field 622 after DVR record command 624. In one implementation, DVR record command 624 may include the excessive DVR request and the address of set top box 110-1 from which the excessive DVR request originated. DVR request allocator 515 may obtain the address of set top box 110-1 from set top box address field 614 of DVR database 610. DVR record command 624 may be received by DVR proxy manager 315-2 of proxy set top box 110-2.

Although not illustrated, in one implementation, DVR request allocator 515 and DVR proxy manager 315-2 may exchange a message, some period of time before the scheduling of the recording, to indicate that proxy set top box 110-2 is up and running and/or that proxy set top box 110-2 will proceed with the recording. DVR request allocator 515 may indicate a confirmation in confirmed field 618 of DVR database 610.

Figure 6E:
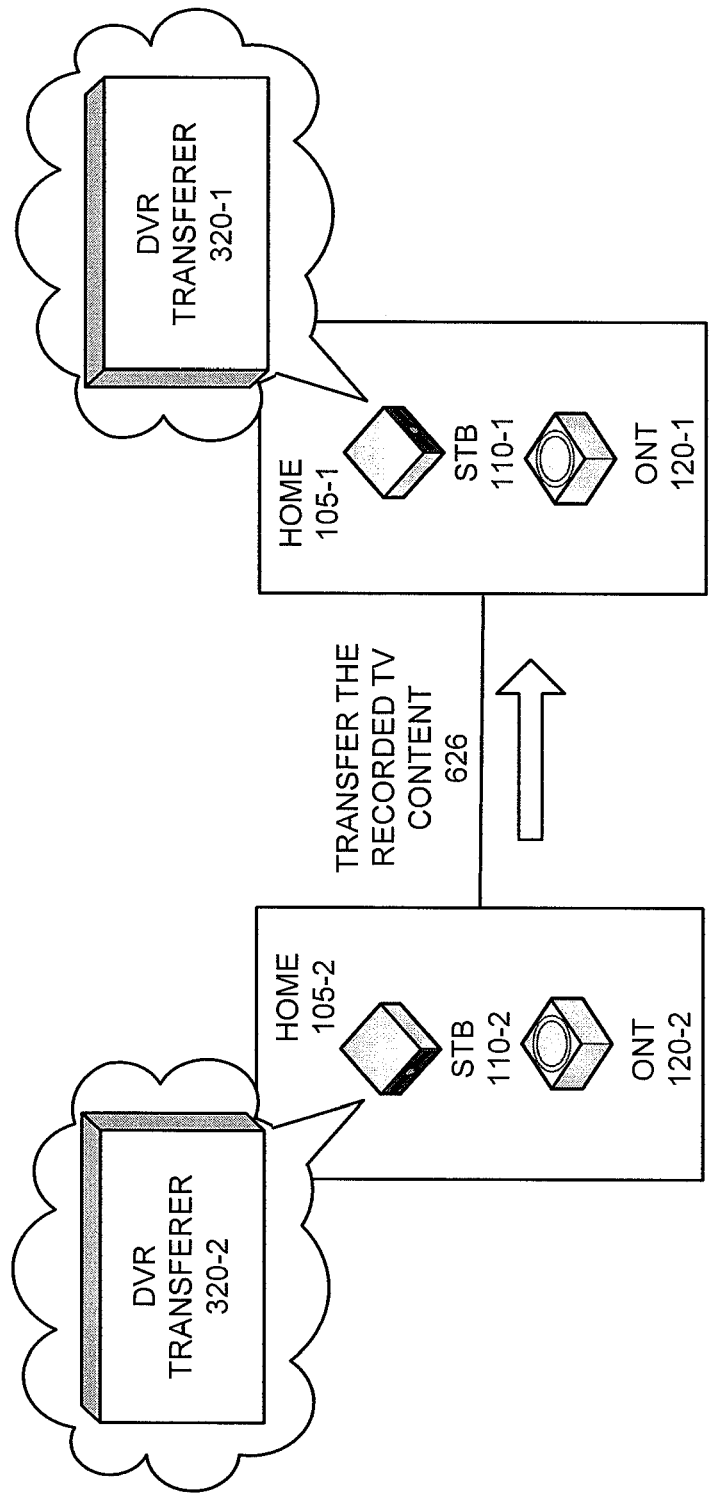

For purposes of discussion, assume that DVR proxy manager 315-2 records the DVR request associated with DVR record command 624. Referring to FIG. 6E, once the television content is recorded, DVR transferer 320-2 of proxy set top box 110-2 may transfer the recorded TV content 626 to DVR transferer 320-1 of set top box 110-1. In the event that multiple set top boxes 110 issued the DVR request, the recorded TV content 626 may be transferred to multiple set top boxes 110. In one implementation, upon completion of the recording of the television content, DVR transferer 320-2 may automatically transfer the recorded television content 626 to set top box 110-1. In another implementation, DVR transferer 320-2 may transfer the recorded television content 626 to set top box 110-1 when the customer, associated with set top box 110-1, issues a request to play the recorded television content. In such an instance, in one implementation, set top box 110-1 may send a play request to DVR management server 145, which may notify proxy set top box 110-2 and initiate the transfer of the recorded TV content 626. In another implementation, set top box 110-1 may send the play request to proxy set top box 110-2. For example, DVR request allocator 515 may provide set top box 110-1 the address of proxy set top box 110-2 (e.g., from proxy set top box address field 620 of DVR database 610) when issuing DVR record command 624 to proxy set top box 110-2.

It will be appreciated that the above-mentioned implementations for transferring the recorded TV content to set top box 110-1 are not exhaustive. For example, in still other implementations, the transfer of the recorded television content 626 may be based on other triggering events, retrieved by set top box 110-1, etc.

Although FIGS. 6A-6E illustrate exemplary operations associated with set top box 110 and DVR management server 145, in other implementations, additional, fewer, and/or different operations may be performed other than those described and illustrated in FIGS. 6A-6E.

Figure 7:
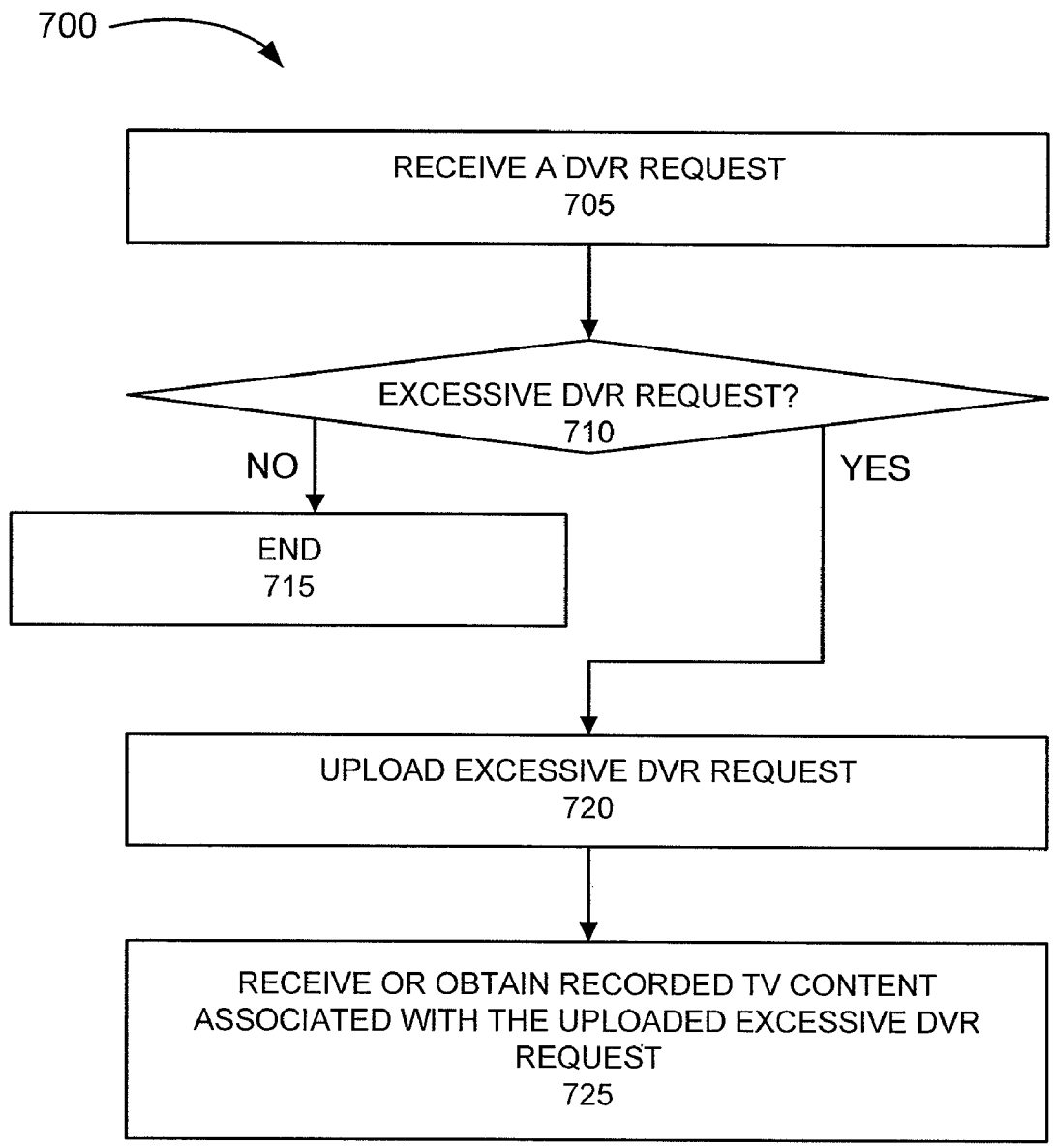
FIG. 7 is a flow diagram illustrating an exemplary process for receiving TV content recorded by another customer's DVR.

FIG. 7 is a flow diagram illustrating an exemplary process 700 for receiving TV content recorded by another customer's DVR. In one implementation, process 700 may be performed by set top box 110 (e.g., DVR client 220).

Process 700 may begin with receiving a DVR request (block 705). For example, as previously described with respect to FIG. 6A and/or elsewhere in this description, the customer may access GUI 602 on TV 115 via set top box 110. The customer may be permitted to select television content that the customer wishes to be recorded. DVR request receiver 305 may receive a DVR request (e.g., scheduled recording 604).

It may be determined whether the received DVR request is an excessive DVR request (block 710). For example, DVR request receiver 305 may determine when the received DVR request corresponds to an excessive DVR request. Depending on the capabilities of set top box 110, the number of television programs that may be recorded simultaneously by set top box 110, may vary. DVR request receiver 305 may recognize when the received DVR request exceeds the capabilities of set top box 110.

When it is determined that the received DVR request is not an excessive DVR request (block 710—NO), process 700 may end (block 715). For example, DVR request receiver 305 may coordinate the recording of the DVR request with set top box 110 since the DVR request may be recorded by set top box 110. In such an instance, a proxy set top box 110 may not be needed and the DVR request may not need to be uploaded to DVR management server 145.

When it is determined that the received DVR request is an excessive DVR request (block 710—YES), the excessive DVR request may be uploaded (block 720). For example, as previously described with respect to FIG. 6B and/or elsewhere in this description, DVR request uploader 310 may upload DVR request 608 to DVR request handler 505 of DVR management server 145. In one implementation, DVR request uploader 310 may upload DVR request 608 based on the customer's input (e.g., the customer may initiate an upload in response to a prompt provided by GUI 602). In another implementation, DVR request uploader 310 may upload DVR request 608 based on a periodic uploading scheme. In yet another implementation, DVR request uploader 310 may upload DVR request 608 once DVR request 608 is received by DVR request receiver 305. In circumstances when, for example, DVR request 608 is deleted (e.g., on set top box 110 by the customer (e.g., customer no longer wishes to record a particular television program)), DVR request uploader 310 may upload other types of messages (e.g., a DVR request deletion message). The DVR request deletion message may be uploaded in manner similar to DVR request 608 (e.g., based on customer input, etc.).

Recorded TV content associated with the uploaded excessive DVR request may be received or obtained (block 725). For example, as previously described with respect to FIG. 6E and/or elsewhere in this description, DVR transferer 320 of proxy set top box 110 may transfer the recorded TV content 626 to DVR transferer 320 of set top box 110. For example, in one implementation, upon completion of the recording of the television content, DVR transferer 320 of proxy set top box 110 may automatically transfer the recorded television content 626 to set top box 110. In another implementation, for example, DVR transferer 320 of proxy set top box 110 may transfer the recorded television content 626 to DVR transferer 320 of set top box 110 when the customer, associated with set top box 110, issues a request to play the recorded television content. In still other implementations, DVR transferer 320 of set top box 110 may retrieve the recorded television content 626 from DVR transferer 320 of proxy set top box 110 and/or other triggering events may be implemented so that set top box 110 receives or obtains the recorded television content.

Although FIG. 7 illustrates an exemplary process 700, in other implementations, additional, fewer, and/or different operations than those described, may be performed.

Figure 8:
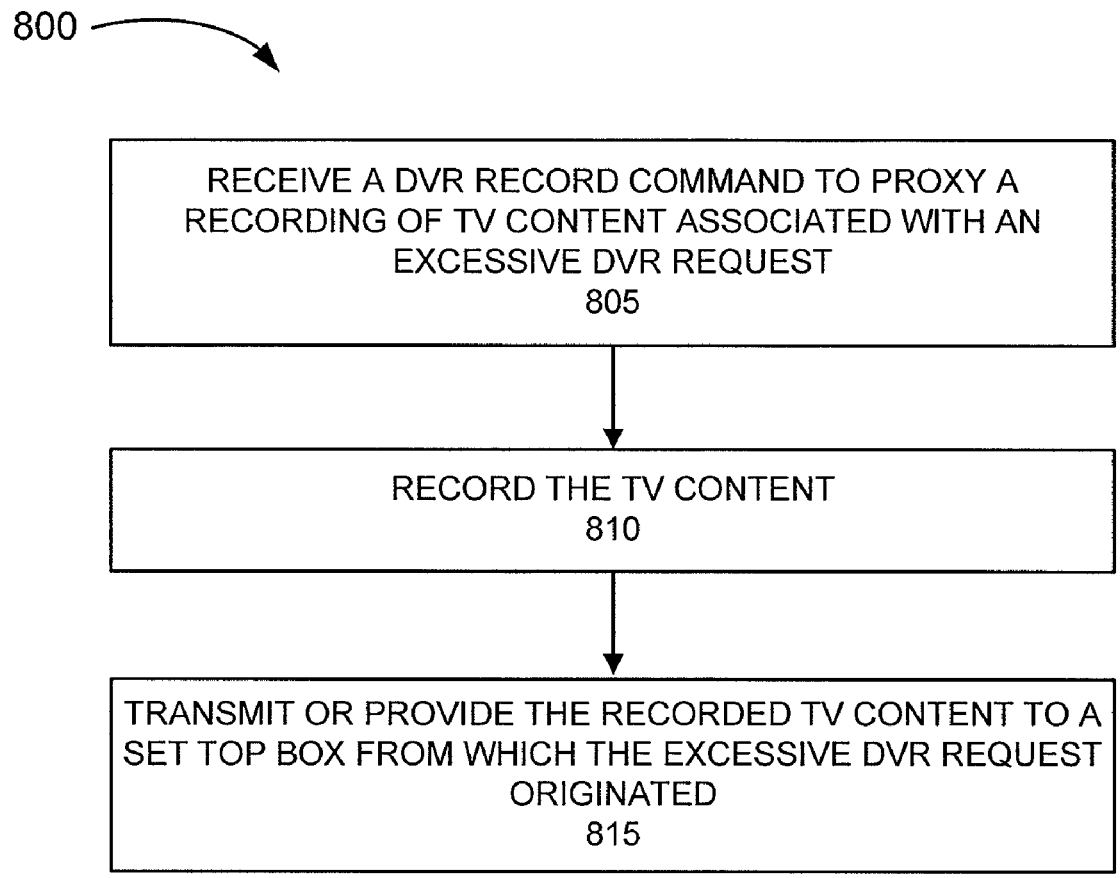
FIG. 8 is a flow diagram illustrating an exemplary process for recording TV content on behalf of another customer.

FIG. 8 is a flow diagram illustrating an exemplary process 800 for recording TV content on behalf of another customer. In one implementation, process 800 may be performed by set top box 110 (e.g., DVR client 220).

Process 800 may begin with receiving a DVR record command to proxy a recording of TV content associated with an excessive DVR request (block 805). For example, as previously described with respect to FIG. 6D and/or elsewhere in this description, DVR proxy manager 315 of proxy set top box 110 may receive a DVR record command 624 (or supplemental DVR record command 624) from DVR request allocator 515 of DVR management server 145. In one implementation, DVR record command 624 may include an excessive DVR request and the address of set top box 110 from which the excessive DVR request originated. The excessive DVR request may correspond to a DVR request that a set top box 110 is unable to fulfill due to a limitation in a number of television programs that a DVR of set top box 110 is capable of recording simultaneously.

The TV content may be recorded (block 810). For example, as previously described with respect to FIG. 6D and/or elsewhere in this description, DVR proxy manager 315 or proxy set top box 110 may record the television content associated with DVR record command 624.

The recorded TV content may be transmitted or provided to a set top box from which the excessive DVR request originated (block 815). For example, as previously described with respect to FIG. 6E and/or elsewhere in this description, DVR transferer 320 of proxy set top box 110 may transfer the recorded TV content 626 to DVR transferer 320 of set top box 110. In some circumstances (e.g., when a supplemental DVR request was received), recorded TV content 626 may be transferred to multiple set top boxes 110. In one implementation, upon completion of the recording of the television content, DVR transferer 320 of proxy set top box 110 may automatically transfer the recorded television content 626 to DVR transferer 320 of set top box 110. In another implementation, DVR transferer 320 of proxy set top box 110 may transfer the recorded television content 626 to DVR transferer 320 of set top box 110 when the customer, associated with set top box 110, issues a request to play the recorded television content. In still other implementations, DVR transferer 320 of set top box 110 may retrieve the recorded television content 626 from DVR transferer 320 of proxy set top box 110 and/or other triggering events may be implemented so that set top box 110 receives or obtains the recorded television content.

Although FIG. 8 illustrates an exemplary process 800, in other implementations, additional, fewer, and/or different operations than those described, may be performed.

Figure 9:
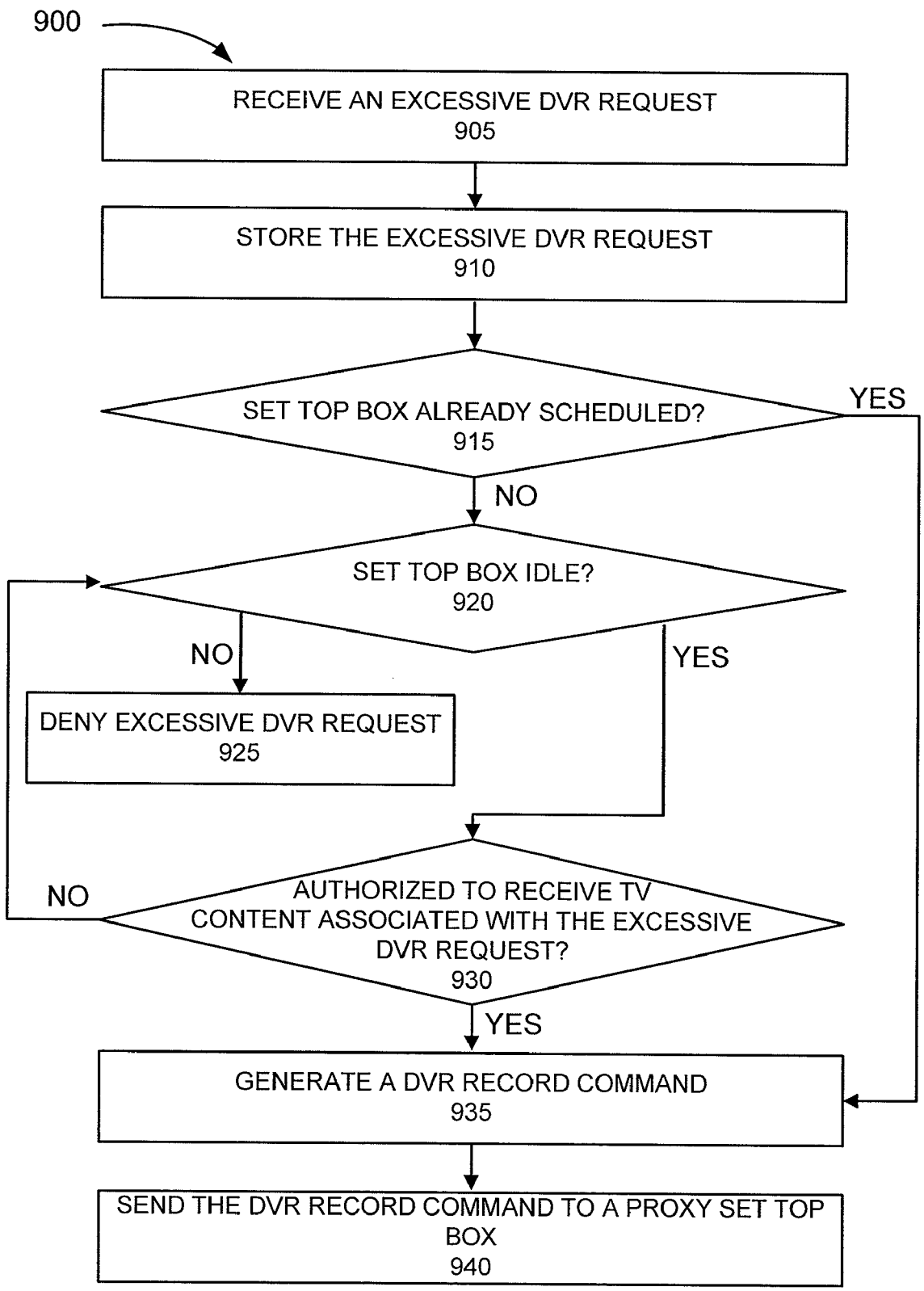
FIG. 9 is a flow diagram illustrating an exemplary process for coordinating the recording of TV content on customers' DVRs on behalf of other customers.

FIG. 9 is a flow diagram illustrating an exemplary process 900 for coordinating the recording of TV content on customers' DVRs on behalf of other customers. In one implementation, process 800 may be performed by DVR management server 145 (e.g., DVR server 420).

Process 900 may begin with receiving an excessive DVR request (block 905). For example, as previously described with respect to FIG. 6B and/or elsewhere in this description, DVR request uploader 310 of set top box 110 may upload DVR request 608 to DVR request handler 505 of DVR management server 145. DVR request 608 may correspond to an excessive DVR request. The excessive DVR request may correspond to a DVR request that set top box 110 is unable to fulfill due to a limitation in a number of television programs that a DVR of set top box 110 is capable of recording simultaneously.

The excessive DVR request may be stored (block 910). For example, as previously described with respect to FIGS. 6B, 6C, and/or elsewhere in this description, DVR database manager 510 of DVR management server 145 may store the uploaded DVR request. For example, DVR database manager 510 may store the uploaded DVR request 608 in DVR database 610.

It may be determined whether a set top box is already scheduled (block 915). For example, as previously described with respect to FIG. 6D and/or elsewhere in this description, DVR request allocator 515 of DVR management server 145 may determine whether a set top box 110 is already scheduled to fulfill the uploaded DVR request 608 based on DVR database 610 (e.g., DVR request field 612 and/or DVR record command sent field 622) and/or a customer database. For example, another customer may have previously uploaded a DVR request 608 to have recorded the same television program. If it is determined that a previously identified set top box 110 is already scheduled to record the television program (block 915—YES), process 900 may proceed to blocks 935 and 940, where a supplemental DVR record command may be generated and sent. However, in the event that it is determined that a previously identified set top box 110 is not already scheduled to record the television program (block 915—NO), it may be determined whether a set top box is idle (block 920). For example, as previously described with respect to FIG. 6D and/or elsewhere in this description, DVR request allocator 515 of DVR management server 145 may determine whether a set top box 110 is idle based on DVR database 610 and/or a customer database. DVR request allocator 515 may identify set top boxes 110 that may be in an idle state based on the number of DVR requests associated with each set top box 110. Set top box 110 may be considered in an idle state when set top box 110 has no DVR requests to fulfill or the number of DVR requests are fewer than the number of DVR requests that set top box 110 is capable of fulfilling.

If it is determined that no set top boxes are idle (block 920—NO), the excessive DVR request may be denied (block 925). For example, DVR request allocator 515 may issue a denial message to DVR request uploader 310 to inform set top box 110 that the uploaded DVR request 608 may not be fulfilled. Since the states of set top boxes 110 may be volatile and change in any given instance, in one implementation, DVR request allocator 515 may issue the denial message to DVR request uploader 310 at a time that is substantially close in time to when the TV content, associated with the uploaded DVR request 608, is to air.

If it is determined that a set top box is idle (block 920—YES), it may be determined whether the set top box is authorized to receive the TV content associated with the excessive DVR request (block 930). For example, as previously described with respect to FIG. 6D and/or elsewhere in this description, DVR request allocator 515 of DVR management server 145 may determine whether set top box 110, which may be in an idle state, is authorized to receive the television content corresponding to the excessive DVR request. For example, DVR request allocator 515 may determine the level of television service associated with set top box 110 based on DVR database 610 and/or the customer database. Based on this information and the excessive DVR request information associated with uploaded DVR request 608, DVR request allocator 515 may determine whether set top box 110 is authorized to receive the TV content associated with uploaded DVR request 608 (i.e., the excessive DVR request).

If it is determined that set top box is not authorized to receive the TV content associated with the excessive DVR request (block 930—NO), process 900 may return to block 920. For example, DVR request allocator 515 may return to block 920 and determine whether there is another set top box 110 that is an idle state.

If it is determined that the set top box is authorized to receive the TV content associated with the excessive DVR request (block 930—YES), a DVR record command may be generated (block 935). For example, DVR request allocator 515 of DVR management server 145 may generate a DVR record command 624 or a supplemental DVR record command 624 (e.g., from block 915—YES). In one implementation, DVR record command 624 may include the excessive DVR request and the address of set top box 110 from which the excessive DVR request originated.

The DVR record command may be sent to a proxy set top box (block 940). For example, DVR request allocator 515 of DVR management server 145 may send DVR record command 624 to DVR proxy manager 315 of proxy set top box 110, as illustrated in FIG. 6D.

Although FIG. 9 illustrates an exemplary process 900, in other implementations, additional, fewer, and/or different operations than those described, may be performed.

The foregoing description of implementations provides illustration, but is not intended to be exhaustive or to limit the implementations to the precise form disclosed. Accordingly, modifications to the embodiments, implementations, etc., described herein may be possible.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 7-9, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   receiving, by a server device and from a first client device, an excessive digital video recording (DVR) request,
      the first client device being capable of recording television content,
      the excessive DVR request being a DVR request that exceeds a number of DVR requests that the first client device is capable of handling, and the DVR request being a request to record the television content;
   identifying, by the server device, a second client device;
   determining whether the second client device is authorized to receive the television content associated with the excessive DVR request;
   selecting the second client device when the second client device is authorized to receive the television content; and
   issuing, by the server device and to the second client device after the second client device is selected, a command to record the television content associated with the excessive DVR request.

2. The method of claim 1, where the command includes a network address associated with the first client device,
   the second client device using the network address to transmit a recording of the television content to the first client device.

3. The method of claim 1, where identifying the second client device comprises:
   identifying the second client device based on a quantity of DVR requests scheduled to be fulfilled by the second client device.

4. The method of claim 1, where determining whether the second client device is authorized to receive the television content associated with the excessive DVR request comprises:
   determining a level of television service associated with the second client device, and
   determining whether the second client device is authorized to receive the television content based on the level of television service.

5. The method of claim 1, further comprising:
   receiving, by the server device and from the first client device, another excessive DVR request to record other television content;
   determining whether a third client device is already scheduled to record the other television content,
      the third client device corresponding to the second client device or a client device that is different from the first client device and the second client device; and
   providing, to the third client device, a supplemental command to record the other television content when the third client device is already scheduled to record the other television content.

6. The method of claim 1, where the first client device comprises a set top box.

7. The method of claim 1, where issuing the command to record the television content comprises:
   providing, by the server device and to the first client device, an address of the second client device,
      the first client device using the address to retrieve a recording of the television content from the second client device.

8. The method of claim 1, further comprising:
receiving, by the server device and from the first client device, a request to delete the DVR request, and
providing, to the second client device, a command based on the request to delete the DVR request.

9. The method of claim 1, further comprises:
determining, when the second client device is not authorized to receive the television content, whether any other client device is capable of recording the television content; and
transmitting, to the first client device, a denial message associated with the excessive DVR request when no other client device is capable of recording the television content.

10. The method of claim 1, where issuing the command comprises:
generating the command based on the excessive DVR request,
the command including the excessive DVR request and an address of the first client device, and
sending the command to the second client device.

11. The method of claim 1, further comprising:
transmitting, before a time that the second client device is scheduled to record the television content, a first message to the second client device to confirm that the second client device is running; and
receiving, from the second client device, a second message that indicates that the second client device is running.

12. A device comprising:
one or more processors to:
receive an excessive digital video recording (DVR) request to record a television program,
the excessive DVR request being a DVR request that exceeds a number of DVR requests that a first client device is capable of recording, and
the DVR request being a request to record the television program, identify a second client device,
determine whether the second client device is authorized to receive the television program associated with the excessive DVR request,
select the second client device when the second client device is authorized to receive the television program associated with the excessive DVR request, and
issue, to the second client device after selecting the second television device, a DVR record command to record the television program associated with the excessive DVR request.

13. The device of claim 12, where, when identifying the second client device, the one or more processors are to:
determine a first quantity of DVR requests scheduled to be fulfilled by the second client device;
determine whether the first quantity is less than a second quantity of DVR requests that the second client device is capable of handling; and
identify the second client device when the first quantity is less than the second quantity.

14. The device of claim 12, where the one or more processors are further to:
transmit, before a time that the second client device is scheduled to record the television program, a first message to the second client device to confirm that the second client device will proceed with recording the television program; and
receive, from the second client device, a second message that indicates that the second will proceed with the recording of the television program.

15. The device of claim 12, where, when determining whether the second client device is authorized to receive the television program, the one or more processors are to:
determine a level of service associated with the second client device, and
determine whether the second client device is authorized to receive the television program based on the level of service.

16. The device of claim 12, where, when identifying the second client device, the one or more processors are to:
determine that the second client device has no DVR request is to fulfill, and
identify the second client device after determining that the second client device has no DVR request is to fulfill.

17. The device of claim 12, where, when the second client device is not authorized to receive the television program, the one or more processors are further to:
determine whether any other client device is capable of recording the television program, and
transmit, to the first client device, a denial message associated with the excessive DVR request when no other client device is capable of recording the television program.

18. A non-transitory computer-readable storage medium comprising:
one or more instructions that, when executed by at least one processor, cause the at least one processor to:
receive a recording request from a first device,
the recording request being a request to record content, the recording request being an excessive digital video recording (DVR) request, and
the excessive DVR request being a DVR request that exceeds a number of DVR requests that the first device is capable of recording at one time;
identify a second device;
determine whether the second device is authorized to receive the content associated with the recording request;
select the second device when the second device is authorized to receive the content;
generate a recording command, to record the content, based on the recording request; and
send the recording command to the second device when the second device is authorized to receive the content.

19. The non-transitory computer-readable storage medium of claim 18, where the one or more instructions to determine whether the second device is authorized to receive the content comprise:
one or more instructions to determine a level of service associated with the second device, and
one or more instructions to determine whether the second device is authorized to receive the content based on the level of service.

* * * * *